Nov. 10, 1931.    H. A. CUMFER    1,831,058
BUILDING BOARD AND PROCESS OF MAKING SAME
Filed Jan. 30, 1928
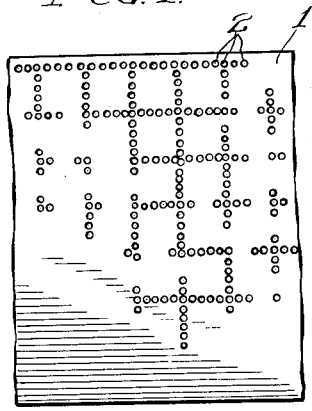
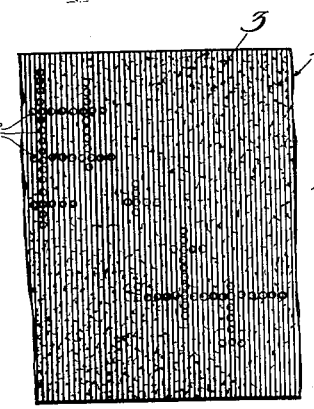
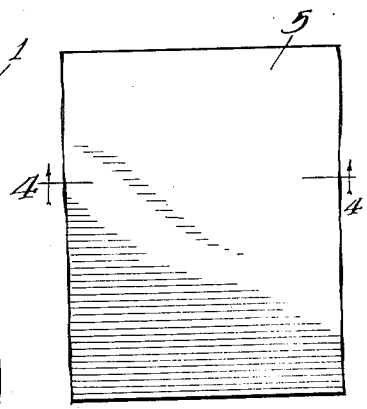
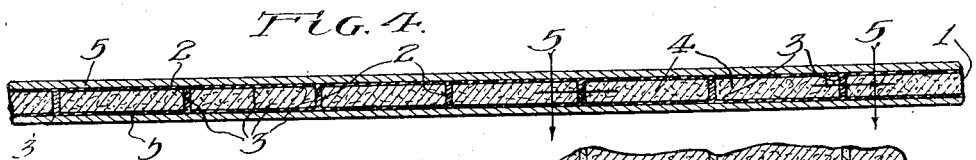
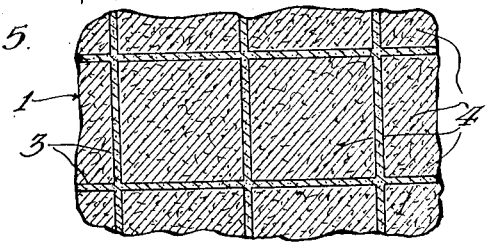
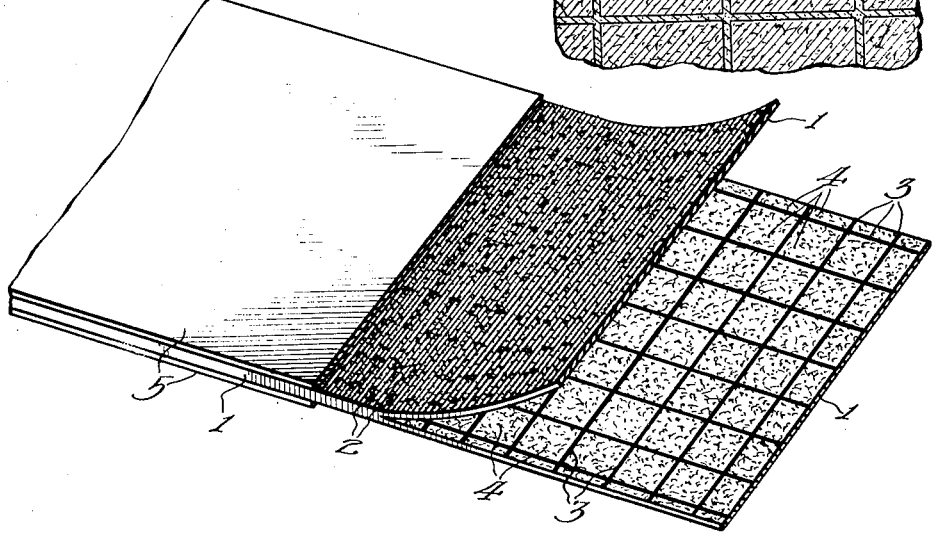
Witness:
Inventor:
Harry A. Cumfer,
By Frank S. Belknap
Atty.

Patented Nov. 10, 1931

1,831,058

UNITED STATES PATENT OFFICE

HARRY A. CUMFER, OF CHICAGO, ILLINOIS, ASSIGNOR OF ONE-HALF TO WILLARD J. MASON, OF GREENWICH, CONNECTICUT

BUILDING BOARD AND PROCESS OF MAKING SAME

Application filed January 30, 1928. Serial No. 250,373.

The present invention relates to the production of a multi-ply fibrous sheet adapted for use in building construction, which sheet possesses certain features of utility and novelty over the prior art which will hereinafter more fully appear and to the novel process of making same.

The invention has for its principal object to improve the qualities of multi-ply fibrous sheet material used as wall board, plaster receiving board and the like in building construction.

The invention has for another object to provide a board with excellent insulating and deadening qualities by providing one or more of the inner plies with very small perforations arranged and proportioned so that when the inner ply is coated or impregnated with asphalt or other adhesive waterproofing material a plurality of sealed air spaces will be formed in the ply due to the asphalt filtering through such perforations into the body of the sheet.

The inner ply or plies of the built up board of the present invention preferably comprises a loosely felted sheet similar to the deadened felt used in the manufacture of roofing material. It is, of course, well known that felt of this kind tends to separate or pull apart, yet in view of its loosely felted condition it serves admirably for insulating and sound deadening purposes.

As a feature of the present invention the binding qualities of the asphalt filtering through the perforations functions to hold the fibers of the inner ply or plies together, preventing same from separating or pulling apart, while at the same time, of course, said asphalt functions to bind the plies adjacent the inner ply or plies to the latter.

It is another object of the present invention to provide a laminated board of felted fibrous materials, characterized by having its inner plies water or moisture resistant due to the utilization of a waterproofing material which simultaneously functions as an adhesive to bind the various plies together into a unitary structure.

In severing building board now on the market either transversely or longitudinally between opposite longitudinal edges, water from different sources will soak inwardly into the board from said severed edge, resulting in dampening the inner ply or plies to an extent where the latter may buckle through contraction and expansion of the water. These severed edges could, of course, be coated with a water resistant material, but this is not practical, since in the application of the board in commercial use by users, the board is cut longitudinally or transversely for the purpose of making it properly fit, and it would be impractical for the person applying the board to waterproof these edges.

As a further feature of the present invention, the asphalt which is filtered through the perforations of the inner ply acts as a barrier to prevent moisture and water from passing beyond a certain point, one method of accomplishing this purpose comprising forming the perforations in lines so that a definite water or moisture resistant barrier is created, the only requirement being that these lines intersect each other at separated points.

Other objects, features and advantages will be more apparent from the following description:

In the drawings, Fig. 1 is a fragmentary plan view of the inner ply subsequent to being perforated.

Fig. 2 is a similar view subsequent to coating or impregnation with the adhesive waterproofing material.

Fig. 3 is a plan view of a built up structure shown in section in Fig. 4.

Fig. 4 is an enlarged cross-sectional view taken on line 4—4 of Fig. 3.

Fig. 5 is a fragmentary cross-sectional view taken on line 5—5 of Fig. 4.

Fig. 6 is a fragmentary perspective of a built up board with certain portions cut away and the inner ply split apart.

Referring more in detail to the drawings, 1 designates an inner ply, which in the present instance may comprise a loosely felted sheet of fibrous material having good insulating and sound deadening qualities. The deadening felt of commerce, particularly that type or grade used in the manufacture of roofing material constitutes an excellent material for the purposes of the present invention. The fiber sheet 1 may be provided with very small perforations 2, for instance, not much larger than perforations such as would be made with a fair sized needle, such perforations being preferably arranged in lines which intersect each other, the purpose of which will be hereinafter explained.

Both surfaces of the sheet 1 may be coated with an adhesive waterproofing material, designated 3, which may comprise, for instance, heated asphalt, said asphalt being of such a consistency as will prevent it from materially penerating the felt sheet 1. This asphalt flows into the perforations and filters for a short distance into the side walls of the perforations. Each perforation is spaced from its adjacent perforation only for that distance which, when the asphalt flows into the perforations, will be coated with the asphalt flowing therethrough from two adjacent perforations. In other words, it is desirable to cause the asphalt to penetrate the intermediate space between two adjacent perforations whereby continuous lines of asphalt coated fiber exist. Thus, the asphalt 3 forms the dead air pockets 4, see Figs. 4, 5 and 6. It is to be understood that the lines of asphalt illustrated in Figs. 5 and 6 are purely diagrammatic and are not intended to exactly illustrate the manner in which the asphalt penetrates, which, of course, would in practice be irregular.

While the asphalt 3 is in an adhesive condition, one or more sheets 5 may be applied to the sheet 1 to form a laminated structure, as shown in Figs. 4 and 6. The sheets 5 may be made of any suitable material, preferably a relatively stiff fibrous sheet adapted to impart qualities of strength and rigidity to the built up board. The asphalt in the perforations 2 serves to further connect and hold the sheets 5 together. Also, the asphalt in the perforations 2 serves to lock the comparatively loose fibers of the sheet 2 to prevent the same from separating, as explained heretofore in detail. In the manufacture of the board, the edges of the sheet 1 may be coated with water resistant material to prevent it from absorbing water or moisture.

As a feature of the present invention the perforations 2 may be arranged in a plurality of spaced lines which intersect each other, thus when the board is cut, as is often necessary to properly fit it to the particular place in which it is to be used, it will be unnecessary to coat the newly severed edge with water resistant material to prevent moisture from creeping into the interior of the board, since a definite barrier has been created by the intersecting continuous lines of asphalt in the sheet 1, see Figs. 5 and 6. It is, of course, understood that the illustration in the drawings which shows these lines as intersecting at right angles is only diagrammatic, and these lines may be curved or may take any other form which will not tend to defeat the object for which they are used.

It is to be understood that means other than perforations in the sheet 1 may be employed to cause the asphalt to form the dead air spaces 4. For instance, the sheet 1 may be calendered or pressed in spots or portions to cause the asphalt absorbing quality of the sheet to be diminished in such spots, and thereafter applying to the sheet hot asphalt. The asphalt will thus not substantially penetrate the calendered portions of the sheet 1, but only the portions not previously calendered or subjected to pressure, thus effecting to some extent the same result as the perforations 2.

While I have illustrated in the drawings a multi-ply product comprising three plies, in which the inner ply has a relatively greater thickness than either of the outer plies, it is obvious that the inner ply may be of the same or of less thickness than either or both of the outer plies, and also that the multi-ply sheet of the present invention may comprise a number of plies from one to ten, more or less.

I do not wish to be limited to the use of the specific type of inner ply 3 described herein and illustrated in the drawings. For instance, this may comprise any kind of a felted fibrous sheet, or a composition sheet made, for instance, by incorporating cork granules in adhering relation.

In using loosely felted fibrous sheets as the inner ply, it may be possible to dispense with the necessity of perforating the sheet to form the sealed air spaces. In this event, I propose to apply the waterproofing material in lines by means of an ordinary printing roll, using a material having qualities of penetration sufficient to permit the material and binder in this manner to soak through and saturate the fibres adjacent the printed lines throughout the thickness of the sheet.

The word "felt" as used in the specification and claims hereof is to be understood and defined as comprising a ply of loosely interlocked felted fibers having the same or similar characteristics as the roofing felt of commerce used in the manufacture of asphalt felt roofing and shingles, tarred felt, floor deadening felt and carpet felt.

I claim as my invention:

1. A laminated fibrous board comprising an inner ply and an outer ply adhering together through the medium of an adhesive waterproofing material, said inner ply provided with relatively small perforations into which said waterproofing material penetrates to form a plurality of dead air spaces and continuous lines constituting water resistant barriers.

2. Building board comprising an inner ply and an outer ply of felted fibrous material adhering through the medium of an adhesive waterproofing material, said inner ply having perforations arranged in spaced lines intersecting each other, said waterproofing material being of such a consistency as not to penetrate materially into the inner ply but penetrating into said perforations to form dead air spaces between and separated water resistant barriers along, the intersecting lines of the perforations.

3. A felted fibrous sheet provided with relatively small spaced perforations on intersecting lines, a coating of waterproofing material on a surface of said sheet and in the perforations thereof, said waterproofing material penetrating the space between adjacent perforations to form continuous intersecting water resistant barriers.

4. A process which comprises first forming relatively small perforations in a felted fibrous sheet on spaced intersecting lines, then coating said sheet with waterproofing material of such a consistency as to penetrate the spaces between adjacent perforations to produce continuous intersecting water resistant barriers and a plurality of spaced apart dead air spaces.

5. A process which comprises first forming relatively small perforations in a felted fibrous sheet on spaced intersecting lines, then coating said sheet with an adhesive waterproofing material of such a consistency as to penetrate the spaces between adjacent perforations to produce continuous intersecting water resistant barriers and a plurality of spaced apart dead air spaces.

6. A loosely felted fibrous sheet having relatively small perforations therein arranged in spaced apart intersecting lines, a coating of adhesive waterproofing material applied thereto, said coating penetrating the spaces adjacent each perforation whereby to form dead air spaces in the sheet and simultaneously bond the fibers in the loosely felted sheet together to prevent unintentional separation thereof.

7. A felted fibrous sheet provided with spaced apart sealed air spaces, said air spaces having been formed during the application of water resistant coating to the surface of said sheet due to the penetration by the latter into the sheet on predetermined continuous, intersecting lines.

In testimony whereof I affix my signature.

HARRY A. CUMFER.